United States Patent
Kuttenberger

(10) Patent No.: US 11,144,327 B2
(45) Date of Patent: Oct. 12, 2021

(54) METHOD FOR OPERATING A CONTROL UNIT, AND DEVICE HAVING AN ASSOCIATED CONTROL UNIT

(71) Applicant: Robert Bosch GmbH, Stuttgart (DE)

(72) Inventor: Alfred Kuttenberger, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 44 days.

(21) Appl. No.: 16/632,769

(22) PCT Filed: Jul. 2, 2018

(86) PCT No.: PCT/EP2018/067801
§ 371 (c)(1),
(2) Date: Apr. 6, 2020

(87) PCT Pub. No.: WO2019/020322
PCT Pub. Date: Jan. 31, 2019

(65) Prior Publication Data
US 2020/0241883 A1      Jul. 30, 2020

(30) Foreign Application Priority Data
Jul. 27, 2017   (DE) .......................... 102017212918.2

(51) Int. Cl.
*G06F 9/4401*  (2018.01)
*B60R 11/04*   (2006.01)
*G06F 11/22*   (2006.01)

(52) U.S. Cl.
CPC ............ *G06F 9/4401* (2013.01); *B60R 11/04* (2013.01); *G06F 11/2284* (2013.01); *B60R 2300/80* (2013.01)

(58) Field of Classification Search
CPC .... G06F 9/4401; G06F 11/2284; B60R 11/04; B60R 2300/80
See application file for complete search history.

(56) References Cited

U.S. PATENT DOCUMENTS

2003/0020812 A1*  1/2003  Gutta ................... G07C 5/0891
                                                                348/148
2012/0050550 A1*  3/2012  Oba ......................... B60R 1/00
                                                                348/207.99

(Continued)

FOREIGN PATENT DOCUMENTS

DE          4409563 A      10/1995
DE    102006036597 A1       7/2007

(Continued)

OTHER PUBLICATIONS

Anonymous, "Siemens PC-D-MCbx," Retrieved from the Internet: http://oldcomputer.info/pc/SiemensPCD/index.htm, Dec. 31, 1986, 5 pages.

(Continued)

*Primary Examiner* — Zahid Choudhury
(74) *Attorney, Agent, or Firm* — Norton Rose Fulbright US LLP; Gerard Messina

(57) ABSTRACT

A method for operating a control unit including a start-up of the control unit in order to bring it into an operative state, and a first start sequence is optionally carried out during the start-up of the control unit in order to set the control unit to a first mode, or a second start sequence is carried out in order to set the control unit to a second mode, the first start sequence including an additional self-test in contrast to the second start sequence.

9 Claims, 2 Drawing Sheets

(56) References Cited

U.S. PATENT DOCUMENTS

| | | | |
|---|---|---|---|
| 2012/0239918 A1 | 9/2012 | Huang | |
| 2014/0258702 A1* | 9/2014 | Freudenschuss | G06F 9/4401 713/2 |
| 2015/0304648 A1 | 10/2015 | Gulati | |
| 2016/0042238 A1* | 2/2016 | Lynam | G05D 1/0061 701/45 |
| 2016/0116974 A1* | 4/2016 | Ginnela | G06F 9/4401 713/2 |
| 2017/0046229 A1* | 2/2017 | Hsu | G06F 9/441 |
| 2017/0167178 A1* | 6/2017 | Lee | E05F 1/002 |
| 2020/0238914 A1* | 7/2020 | Almahmoud | B60Q 9/00 |

FOREIGN PATENT DOCUMENTS

| | | |
|---|---|---|
| DE | 202004021698 U1 | 9/2010 |
| DE | 102006012336 A1 | 11/2016 |
| EP | 11920 A2 | 6/1980 |
| EP | 1870727 A1 | 12/2007 |
| EP | 3073456 A2 | 9/2016 |
| JP | 61168337 A | 9/1986 |
| JP | S61198337 A | 9/1986 |

OTHER PUBLICATIONS

International Search Report for PCT/EP2018/067801, dated Oct. 9, 2018.

* cited by examiner

METHOD FOR OPERATING A CONTROL UNIT, AND DEVICE HAVING AN ASSOCIATED CONTROL UNIT

FIELD

The present invention relates to a method for operating a control unit and to a device having an associated control unit.

BACKGROUND INFORMATION

In control units that are developed for safety-relevant functions, certain tests are carried out when the control unit is started up in an effort to check whether the components of the control unit function correctly. This is known as a self-test. Such a self-test is particularly important if the control unit involves a control unit having safety functions with a corresponding ASIL classification.

For example, German Patent No. DE4409563A and EP Patent No. EP11920A2 describe control units which are capable of carrying out a self-test. German Patent Application No. DE102006036597A1 additionally also describes an electronic device which offers an option of carrying out a rapid boot process.

However, while it is often required that a control unit be rapidly available, such an availability of the control unit is frequently delayed on account of the self-test.

SUMMARY

An example method for operating a control unit according to the present invention includes a start-up of the control unit in order to bring it into an operative state, and a first start sequence is optionally carried out during the start-up of the control unit in order to set the control unit to a first mode, or a second start sequence is carried out in order to set the control unit to a second mode, the first start sequence including an additional self-test in contrast to the second start sequence.

The example device according to the present invention includes a control unit which is able to be brought into an operative state by the start-up, the control unit being developed to optionally perform a first start sequence during the start-up in order to set the control unit to a first mode, or to perform a second start sequence in order to set the control unit to a second mode, the first start sequence including an additional self-test in contrast to the second start sequence.

This makes it possible to bring the control unit either into an operating state in which it may be used for safety-relevant functions, i.e., the first mode, or into an operating state in which it may be rapidly available but is unsuitable for safety-relevant functions, i.e., the second mode. The control unit is particularly configured to provide an indicator which identifies whether the control unit is in the first mode or the second mode. Through an appropriate choice of the first start sequence or the second start sequence, it is thus possible to select the functions for which the control unit is to be used.

A control unit is an electronic system that allows the operation of electrical components. Counted among the electrical components are especially elements that are suitable for influencing an operating state of a vehicle, and also components, in particular sensors, that are suitable for detecting certain parameters.

When the control unit is started up, this means that the control unit is brought into an operative state. In other words, the control unit is initially in a state in which it is either switched off or in what is known as a standby mode or sleep mode. The transition between this state and the operative state is referred to as a start-up of the control unit. A start sequence is a sequence of one or more steps that the control unit carries out during the start-up of the control unit. In contrast to the second start sequence, the first start sequence includes an additional self-test. In other words, a self-test, which is not performed during the second start sequence, is executed during the first (start) sequence. A self-test is to be understood as a validation of correct operating parameters. During the self-test, an operativeness of the control unit and/or of electrical components that are connected to the control unit is checked.

Preferred further developments of the present invention are described herein.

Preferably, the control unit provides information for a first system, the information being made available to the first system or being used by the first system only if the control unit is in the first mode. In other words, the information is not made available to the first system or is not used by the first system if the control unit is in the second mode. The first system thus uses the information supplied by the control unit only if the control unit has carried out the self-test. The first system is a safety-relevant system, in particular. It may therefore be ensured that only data that were generated by a fully operative control unit are made available to the first system. For example, the information may be a signal from a sensor which is coupled to the first control unit. The first system uses the measured values of this sensor only if the control unit is in the first mode. In particular, the information thus is not transmitted to the first system, is marked as not usable, or an indicator is provided to the control unit making it clear to the first system that the information is not to be used. Alternatively or additionally, the control unit provides a function for the first system, the function being provided to the first system or being used by the first system only if the control unit is in the first mode. A function is an action that is triggered by the first system. For example, a function is the operation of a signaling means which is actuated via the control unit.

More specifically, the first system is a system that is relevant for a driving operation of a vehicle. The first system thus is a driver-assistance system, in particular. The first system therefore is a safety-relevant system. If an operativeness of the control unit is not ensured because the self-test has not been carried out, then accidents may happen during a driving operation of the vehicle. It is therefore advantageous if systems that are relevant for the driving operation of the vehicle access the control unit only if the operativeness and security of the control unit are ensured.

It is also advantageous if the control unit supplies information to a second system, the information for the second system being provided when the control unit is in the first and/or in the second mode. Alternatively or additionally, the control unit provides a function for a second system, the function for the second system being provided when the control unit is in the first or the second mode. In other words, the second system is able to use the information and/or functions provided by the control unit at all times, regardless of whether the control unit is in the first mode or the second mode. This therefore allows the second system to gain rapid access to information or functions provided by the control unit. The start-up of the control unit is triggered in the process, in particular by the second system. The second system is therefore able to use the control unit even if it is not ensured that the control unit is fully operative.

It is also advantageous if the second system is a vehicle monitoring system, which is set up to record an event in the environment of the vehicle or which is set up to be in operation only during a standstill of the vehicle. The vehicle monitoring system thus is a system that is not safety-relevant because information is simply recorded or an accident is already precluded by the fact that the vehicle is not moving, i.e., is at a standstill.

The execution of the second start sequence for setting the control unit to the second mode preferably takes place in response to a trigger signal supplied by a sensor unit. Thus, it is possible to dispense with an interaction with a user, meaning that the control unit is available for use in a particularly rapid manner. The sensor unit especially includes a sensor which is suitable for detecting an event in the environment of a vehicle. The second system particularly includes the sensor unit. In this context it is advantageous if both the second system and the control unit are activated by the sensor unit. Such a system is capable of a very rapid response to an event that is detected by the sensor unit.

It is furthermore advantageous if the control unit is a control electronics for a sensor, in particular for a camera system. If the control unit is a control electronics for a camera system, then images from the camera system are able to be supplied in the first mode and it is ensured that the images do not include any errors, or the images may be provided in the second mode so that images can be supplied very rapidly. Using the first system and the second system, it is therefore possible to make functions available that respond to an event either in a rapid or in a highly reliable manner. This particularly prevents the second system from responding to an event too late. The camera system is what is called an NTC system, in particular.

It is furthermore advantageous if the additional self-test is carried out following a start-up of the control unit during which the second start sequence was executed, in response to a request for setting the control unit to the first mode. This means that the control unit, once it is in the second mode, is set to the first mode in response to the request. The self-test thus is carried out retroactively. For this purpose, the control unit is particularly started up anew and the first start sequence is executed in full or the self-test is otherwise carried out retroactively in an independent manner. For example, this makes it possible for the second system to rapidly respond to an event but subsequently also allows for a safe operation of the first system.

During the start-up of the control unit, a switch is preferably first set to a first position, and at the end of the first start sequence the switch is set to a second position, the switch being configured to prevent an execution of a safety-relevant function when the switch is in the first position. This prevents information or functions provided by the control unit from being used by the first system already prior to the conclusion of the start operation of the control unit, i.e. the start-up of the control unit. In addition, a generally usable indicator is made available, which may be used by a variety of different devices for querying whether the control unit is suitable for supplying safety-relevant information or functions. The switch consequently is an indicator of the mode currently assumed by the control unit. The switching circuit with the switch is particularly developed as a failsafe switching circuit. This means that the control unit actuates the switch in such a way that it is in the first position if an error has occurred in the control unit or in the switch. It is pointed out here that the switch may be in the first position during the neutral state, meaning that setting the switch to the first position does not cause any physical movement of the switch.

The control unit preferably is a control unit that is operated in a vehicle.

BRIEF DESCRIPTION OF THE DRAWINGS

Below, exemplary embodiments of the present invention are described in detail with reference to the figures.

DETAILED DESCRIPTION OF EXAMPLE EMBODIMENTS

Figure 1:
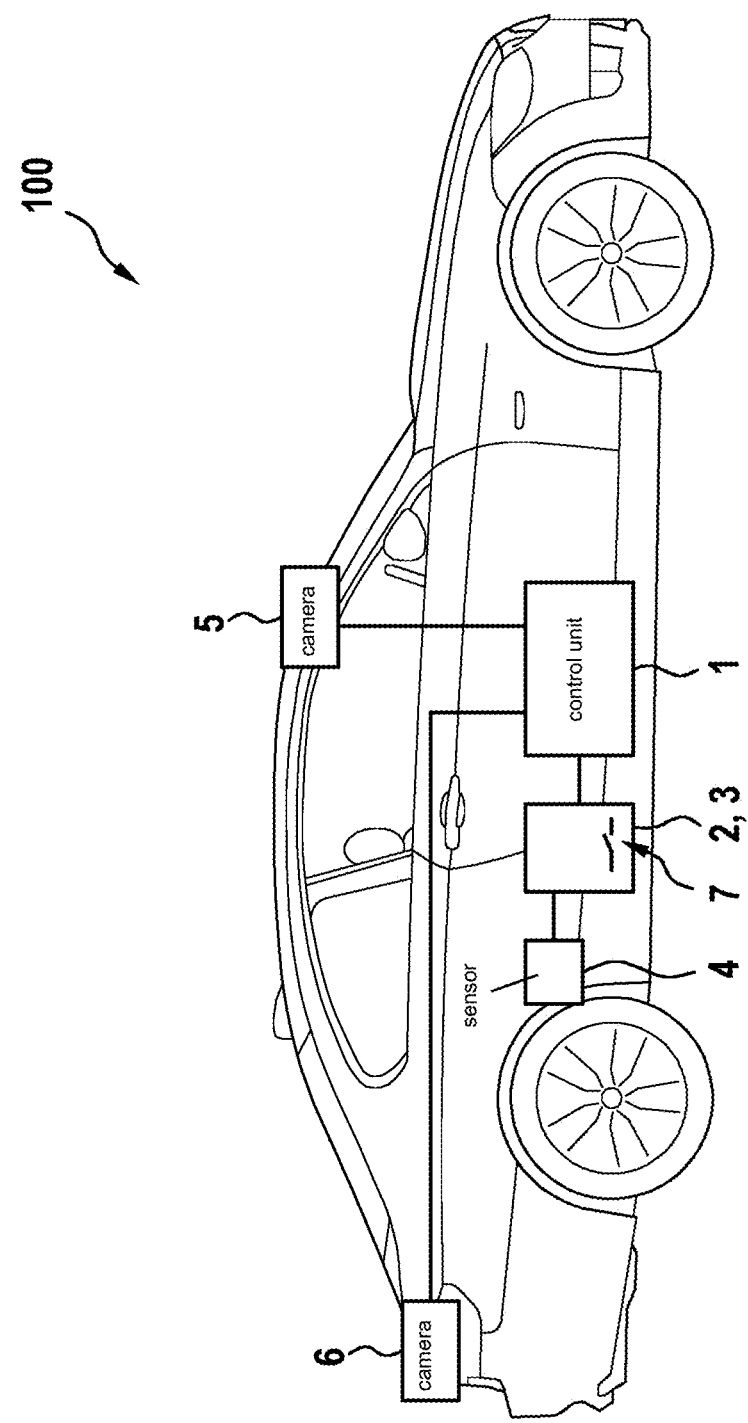
FIG. 1 shows an illustration of a vehicle, which includes a device according to the present invention having a control unit according to an exemplary embodiment of the present invention.

FIG. 1 shows a vehicle 100. A control unit 1, which is able to be brought into an operative state by its start-up, is situated in vehicle 100.

Figure 2:
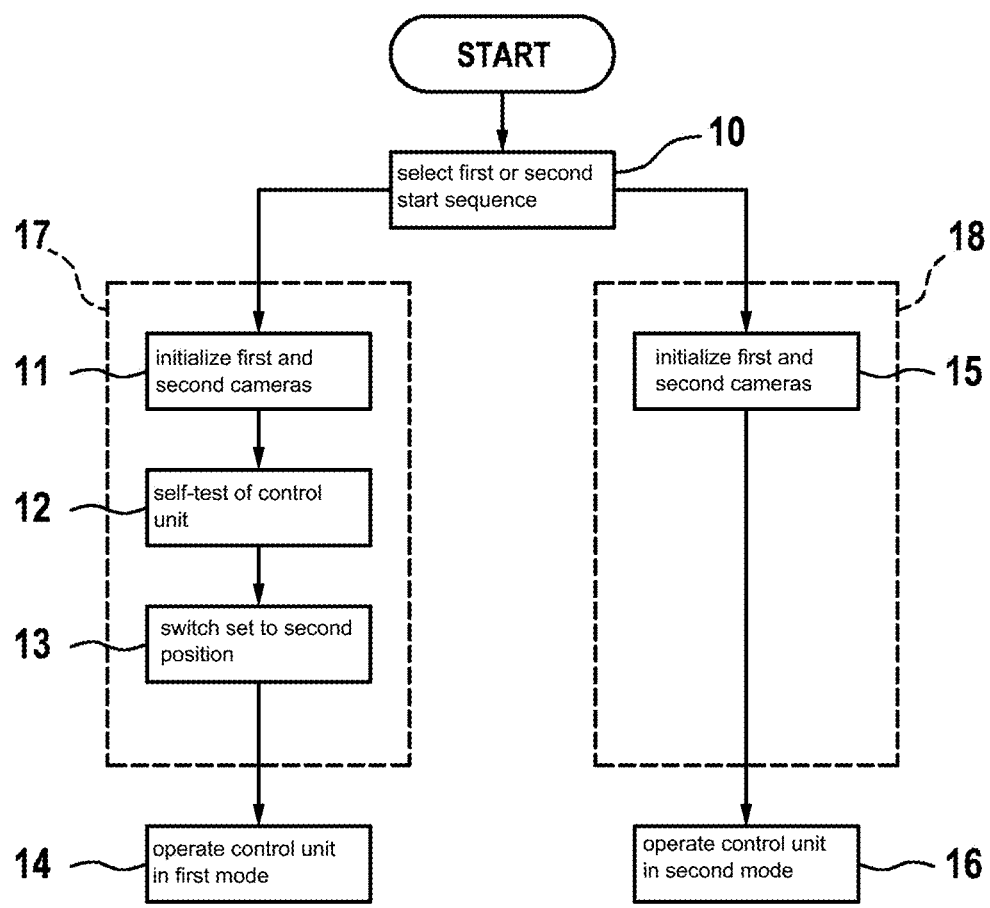
FIG. 2 shows an illustration of an exemplary flow diagram of the method according to the present invention for operating a control unit according to an exemplary embodiment of the present invention.

Control unit 1 is an electronic control unit which includes a control electronics of a camera system. In the exemplary embodiment described here, a first camera 5 and a second camera 6 are therefore coupled with control unit 1. First camera 5 and second camera 6 acquire an environment of vehicle 100. Cameras 5, 6 transmit the acquired images from camera 5, 6 to control unit 1, which makes them available for further use by other system 2, 3 of vehicle 100 when control unit 1 is in an operative state. Control unit 1 carries out the method for operating a control unit 1 shown in FIG. 2.

Additional systems 2, 3 which provide different functions, are situated in vehicle 100. To this end, these systems 2, 3 access control unit 1 in order to obtain the images from cameras 5, 6 via control unit 1. Systems 2, 3 are divided into systems that are safety-relevant and those that do not provide any safety-relevant functions.

In this exemplary embodiment, vehicle 100 includes a first system 2, which is a driver-assistance system. For example, such a driver-assistance system in particular is able to provide a semi-autonomous or autonomous control of vehicle 100. In addition, vehicle 100 includes a second system 3, which is an evidence preservation system. Second system 3 is set up to detect a parking dent, to store images recorded by cameras 5, 6 and to make them available for subsequent evidence preservation purposes. It is pointed out that the mentioned systems should be understood as examples and may also be replaced by other systems or supplemented by additional systems.

In this embodiment, first system 2 is a safety-relevant system because for one, it has to satisfy standardized safety criteria; for another, a risk to a user of vehicle 100 would be created if first system 2 were not to function correctly. Second system 3 is no a safety-relevant system because it neither has to satisfy the standards set for first system 2 nor will bodily harm come to the user in the event of a failure of the system. A further example of a safety-relevant system is an early accident detection. Another example of a non-safety-relevant system is a user detection, for instance, in which an owner of vehicle 100 is identified when the owner approaches vehicle 100.

Second system 3 is able to sense whether vehicle 100 was touched by a third vehicle while vehicle 100 is parked. Vehicle 100, for instance, is parked in a parking space while no passenger is inside vehicle 100. If a collision, generally known as a parking dent, with the third vehicle occurs in this state, second system 3 is meant to acquire images of vehicle 100 with the aid of cameras 5, 6 and to store them in order to preserve evidence. Such a collision, for instance, is detected by a sensor unit 4, which includes an acceleration sensor, for example. Control unit 1 and associated cameras 5, 6 are in a standby or sleep mode in this case, which has a very low current consumption, and only the collision-detection sensors, i.e. sensor unit 4, are monitored by second system 3.

Once the collision is detected, control unit 1 and associated cameras 5, 6 have to be started up as quickly as possible in order to be able to record and store the collision scene for evidence preservation. Certain routines and tests that require a certain amount of time are usually carried out during a normal start-up of control unit 1 and associated cameras 5, 6. In principle, it may happen that the situation in the environment of vehicle 100 during this start-up changes to such an extent that unambiguous proof is no longer possible because the start-up consumes too much time.

For this reason, control unit 1 is set up to optionally carry out a first start sequence 17 during the start-up for setting control unit 1 to a first mode, or to carry out a second start sequence 18 for setting control unit 1 to a second mode. Toward this end, control unit 1 executes the method according to the present invention. This is shown in an exemplary embodiment in FIG. 2.

The present method is started in a state during which control unit 1 is in the sleep mode. In a first method step 10, it is detected whether a start-up of control unit 1 is required and a selection is made as to whether first start sequence 17 or second start sequence 18 will be executed. Control unit 1 is coupled with first system 2 and second system 3 toward that end. Control unit 1 will then be started up if first system 2 or second system 3 requires images from cameras 5, 6. A start-up of control unit 1 thus is started especially by a request, which is transmitted to control unit 1 by first system 2 or second system 3. If the camera images from cameras 5, 6 are required by first system 2, then first start sequence 17 will be carried out and control unit 1 is set to the first mode. If the camera images from cameras 5, 6 are required by second system 3, e.g., because the acceleration sensors of vehicle 100 have detected a collision, then second start sequence 18 will be executed and control unit 1 is set to the second mode.

In addition, a switch 7 is set to a first position in first method step 10. In this embodiment, first switch 7 is a relay or transistor. Control unit 1 supplies a control voltage in order to set switch 7 to the first position or a second position, i.e. in order to open and close switch 7. If no control voltage is applied to switch 7, it is in the first position. First system 2 is coupled with switch 7 and carries out its safety-relevant functions only if switch 7 is in the second position. If switch 7 is in the first position to which it was set during first method step 10, then an execution of the safety-relevant function is prevented by first system 2.

If the start-up of control unit 1 was requested by first system 2, then a second method step 11 will be carried out. If the start-up of control unit 1 was requested by second system 2, then a sixth method step 15 will be performed.

To begin with, a situation is examined in which the start-up of control unit 1 was requested by first system 2 and second method step 11 is therefore carried out.

In second method step 11, first camera 5 and second camera 6 are supplied with a supply voltage and thus initialized. A software of control unit 1 is started at the same time. This is followed by the execution of a third method step 12.

In third method step 12, a self-test of control unit 1 takes place. For this purpose, images are requested from cameras 5, 6 and these images are evaluated in order to ascertain whether the images from cameras 5, 6 are free of errors. For example, a faulty connection to one of cameras 5, 6 is able to be detected in this way.

If the self-test, and thus third method step 12, has been successfully concluded, i.e., if no error has been detected, then a fourth method step 13 is executed. In fourth method step 13, switch 7 is switched to the second position. This signals to first system 2 that control unit 1 is operative and in the first mode. First start sequence 17 was therefore successfully run through, first start sequence 17 in this embodiment including second method step 11, third method step 12 and fourth method step 13.

In a fifth method step 14, which follows fourth method step 13, control unit 1 will then be operated in the first mode until control unit 1 is switched off or reset to the sleep mode.

If second system 3 requests the start-up of control unit 1 in first method step 10, then second start sequence 18 is carried out. In this embodiment, second system 3 includes sensor unit 4, which provides a trigger signal. Sensor unit 4 is the collision-detection sensor, which is developed as an acceleration sensor by way of example. It provides the trigger signal if an acceleration above a predefined threshold value is detected. The execution of second start sequence 18 in order to set control unit 1 to the second mode thus takes place in response to the supply of a trigger signal by sensor unit 4.

In second start sequence 18, sixth method step 15 is initially carried out. It essentially corresponds to second method step 11. Control unit 1 and connected cameras 5, 6 are thus initialized.

In a seventh method step 16 following sixth method step 15, control unit 1 is now operated in the second mode until control unit 1 is switched off or reset to the sleep mode.

As an alternative, control unit 1 may also be switched from the second mode to the first mode by carrying out third method step 12. This is indicated by a dashed arrow in FIG. 2. Such a transition from the second mode to the first mode particularly takes place in response to a request, which, for instance, is a request by first system 2 for an image from cameras 5, 6. Alternatively, the present method may also branch to first method step 10 in order to set control unit 1 to the first mode by a full execution of first start sequence 17.

It should be noted that switch 7 was not set to the second position after the execution of second start sequence 18. It is therefore still in the first position. This signals to first system 2 that camera images from cameras 5, 6 supplied via control unit 1 are not suitable for use by first system 2. In other words, switch 7 is in the first position when control unit 1 is set to the second mode. In addition, it follows that switch 7 is in the second position when control unit 1 is set to the first mode.

Thus, the images from cameras 5, 6 supplied via control unit 1 may be used by first system 2 only if control unit 1 is in the first mode since first system 2 utilizes these camera images only if switch 7 is in the corresponding position. Second system 3 does not consider the particular position of switch 7. This means that the images made available via control unit 1 are able to be used by second system 3 whenever control unit 1 is started up. In other words, second system 3 utilizes the information supplied by control unit 1, i.e. the camera images, regardless of whether control unit 1 is in the first mode or the second mode.

If the start-up of control unit 1 was triggered by second system 3 and second start sequence 18 was thus carried out, a shortened start sequence is consequently executed because the self-test is not performed in third method step 12. In other words, first start sequence 17 includes an additional self-test 12 in comparison with second start sequence 18. It should be pointed out that second start sequence 18 may include a shortened self-test in alternative embodiments, which includes fewer steps than the sequence executed in first start sequence 17.

In particular in the described case in which first system 2 is a driver-assistance system and second system 3 is an evidence-preserving system, it is an object of the present invention to carry out a different boot sequence in special cases, which is considerably faster so that a scene in the environment of the vehicle is able to be recorded in such a way that it is usable as evidence. In this case, a shortening of the boot time is achieved by skipping and omitting test cases, e.g., a memory test, shut-off path test, etc. This is possible because vehicle 100 is in a parked position, which means that no risk emanates from vehicle 100. With the aid of this function, it must then be ensured that only the permitted functions and no safety-relevant functions are carried out in such a case. For example, this is able to be ensured in that a safety μC/ASIC monitors this situation and switches off control unit 1 and/or cameras 5, 6 again after a certain period of time, or—if the driver requests it—resets them to the normal boot process so that the tests and safety checks are then carried out. Only after this has been done may safety functions, for instance, be activated. Another method consists of setting switch 7 in each start-up of the control device and cameras 5, 6, at the beginning of the start-up, switch 7 preventing the activation of safety-relevant functions because the switch acts as an access condition for the safety functions. In the further course of a normal start-up and after the successful execution of all safety tests, this switch 7 is set so that the safety functions are able to be activated. If another control unit carries out the collision detection, the camera system is reactivated by a special message and then starts up in a safe mode as described earlier.

In the described example embodiment, control unit 1 provides images from camera 5, 6 as information to first system 2 and second system 3. In alternative embodiments, control unit 1 provides functions for first system 2 and second system 3. In alternative embodiments of the present invention, control unit 1 is a control unit of a signal transducer, for example. Different illumination ranges of the headlights of vehicle 100, for instance, are actuated via control unit 1. This function is able to be immediately provided to second system 3 in the second mode for a direct illumination of the surrounding scenery of vehicle 100. However, if the illumination ranges are required by control unit 1 only for a cornering illumination while the vehicle is in operation and thus are requested by a safety-relevant system, e.g., first system 2, then this is implemented only if control unit 1 is in the first mode.

In addition, while switch 7 is a preferred technique for signaling whether control unit 1 is in the first mode or the second mode, different signaling takes place in other advantageous embodiments of the present invention. For example, control unit 1 is connected to first system 2 and second system 3 via a digital bus, for instance. In order to signal whether control unit 1 is in the first mode or the second mode, a data packet may be allocated to the images provided by control unit 1, this data packet describing the current state of control unit 1. Through a corresponding evaluation of the data packet by first system 2 and second system 3, it may be detected whether the information or functions of control unit 1 are able to be utilized by respective system 2, 3. Alternatively, it is advantageous if first system 2 and second system 3 are coupled with control unit 1 using different signal lines. In this case, an output at the location where the signal line leading to first system 2 is connected will be enabled only if control unit 1 is in the first mode.

It is furthermore pointed out that first system 2 and second system 3 do not necessarily require separate hardware but may also be implemented on a shared hardware, for instance in the form of differently executed applications.

What is claimed is:

1. A method for operating a control unit that (a) is communicatively coupled to a first system that is configured to perform a first operation using data output from the control unit when the control unit entered into an operative mode using a first start sequence and not when the control unit entered into the operative mode using a second start sequence and (b) is communicatively coupled to a second system that is configured to perform a second operation when the control unit entered into the operative mode using the first start sequence and also when the control unit entered into the operative mode using the second start sequence, wherein the first start sequence includes performance by the control unit of a self-test and the second start sequence does not include the performance by the control unit of the self-test, the method comprising the following steps:
    in response to an initiation of a start-up of the control unit being caused by one of the first system for performing the first operation and the second system for performing the second operation, performing the start-up of the control unit to bring the control unit into the operative state, the performing of the start-up of the control unit including:
        the control unit determining whether to perform the self-test depending on for which of the first operation and the second operation the start-up has been initiated; and
        depending on, and in accordance with, a result of the determination, the control unit either executing the first start sequence or the second start sequence to enter the control unit into the operative mode; and
    the control unit outputting the data while the control unit is in the operative mode entered into by the start-up, wherein the output data is provided so that it is thereby accessible to at least one of the first system and the second system.

2. The method as recited in claim 1, wherein the first operation is a driving operation of a vehicle.

3. The method as recited in claim 1, wherein the second operation is a recording of an event in an environment of a vehicle or is performed during a standstill of the vehicle.

4. The method as recited in claim 1, wherein the control unit determines to execute the second start sequence including the self-test to set the control unit into the operative mode whenever the initiation is triggered by a predefined signal, which is supplied by a sensor.

5. The method as recited in claim 1, wherein the control unit is a control electronics for a sensor for a camera system.

6. The method as recited in claim 1, further comprising:
    subsequent to executing the second start sequence based on a result of the determination being that the initiation of the start-up was caused for performance of the second operation, performing the self-test so that the first operation can be carried out using the control unit after the data has been output and provided to the second system for performance of the second operation.

7. The method as recited in claim 1, wherein during the start-up of the control unit, a switch is first set to a first position, the first start sequence includes setting the switch to a second position, and the switch is not set to the second position in the second start sequence and prevents execution of the first operation when the switch is in the first position, the first operation being a safety-relevant operation.

8. A device including a control unit control unit that (a) is communicatively coupled to a first system that is configured to perform a first operation using data output from the control unit when the control unit entered into an operative mode using a first start sequence and not when the control unit entered into the operative mode using a second start sequence and (b) is communicatively coupled to a second system that is configured to perform a second operation when the control unit entered into the operative mode using the first start sequence and also when the control unit entered into the operative mode using the second start sequence, wherein:
the first start sequence includes performance by the control unit of a self-test;
the second start sequence does not include the performance by the control unit of the self-test;
the control unit is configured to:
in response to an initiation of a start-up of the control unit being caused by one of the first system for performing the first operation and the second system for performing the second operation:
execute the first start sequence to set the control unit into the operative mode whenever the initiation of the start-up is caused for performance of the first operation; and
execute the second start sequence to set the control unit into the operative mode whenever the initiation of the start-up is caused for performance of the second operation; and
output the data while the control unit is in the operative mode entered into by the start-up so that the data is thereby accessible to at least one of the first system and the second system.

9. A method for operating a control unit that (a) is communicatively coupled to a first system that is configured to perform a first operation using data output from the control unit when the control unit entered into an operative mode using a first start sequence and not when the control unit entered into the operative mode using a second start sequence and (b) is communicatively coupled to a second system that is configured to perform a second operation when the control unit entered into the operative mode using the first start sequence and also when the control unit entered into the operative mode using the second start sequence, wherein the first start sequence includes performance by the control unit of a self-test and the second start sequence does not include the performance by the control unit of the self-test, the method comprising the following steps:
in response to an initiation of a start-up of the control unit being requested by one of the first and second systems, performing the start-up of the control unit to bring the control unit into the operative state, the performing of the start-up of the control unit including:
the control unit determining whether to perform the self-test depending on which of the first and second systems requested the initiation; and
depending on, and in accordance with, a result of the determination, the control unit either executing the first start sequence or the second start sequence to enter the control unit into the operative mode; and
the control unit outputting the data while the control unit is in the operative mode entered into by the start-up, wherein the output data is provided so that it is thereby accessible to at least one of the first system and the second system.

* * * * *